June 3, 1941.  E. B. TURNER  2,244,378

FISH LURE

Filed Jan. 29, 1940

INVENTOR.
Edwin B. Turner
BY
Robb & Robb
ATTORNEYS

Patented June 3, 1941

2,244,378

UNITED STATES PATENT OFFICE 2,244,378

FISH LURE

Edwin B. Turner, Wellington, Ohio

Application January 29, 1940, Serial No. 316,258

7 Claims. (Cl. 43—45)

This invention relates to a fish lure, and more particularly, to an improved form of connecting device for connecting a rotatable fish lure to a trolling line.

In rotatable fish lures, the customary practise is to provide a connection for securing the rotatable lure to the trolling line for the purpose of permitting turning movement of the lure relative to the member secured to the trolling line. To this end, a swivel is usually employed and is connected to the lure for rotation therewith and is rotatably connected to a member secured to the trolling line. However, there is always a part of the swivel frictionally engageable with the member secured to the trolling line which, when rotated, creates a frictional force resulting in a torque tending to rotate the member secured to the trolling line. When the member secured to the trolling line is thus rotated, the rotating motion is imparted to the trolling line and results in a twisting of the trolling line which is highly undesirable.

Accordingly, an important object of this invention is to provide a device for connecting a rotatable fish lure to a trolling line which will be effective to prevent twisting of the trolling line by rotational movement of the part connected to the lure.

A further object is to provide, in a device for connecting a rotatable fish lure to a trolling line, frictional means for counteracting the frictional force or torque tending to impart a rotating movement to the part connected to the trolling line.

A further object is to provide, in a device of the character referred to, a compensating member adapted to be rotated in a direction opposite to the direction of rotation of the fish lure as it is drawn through water.

Other objects and advantages of the invention will become apparent during the course of the following description.

In the drawing there is shown a preferred embodiment of the invention. In this showing:

Figure 1:
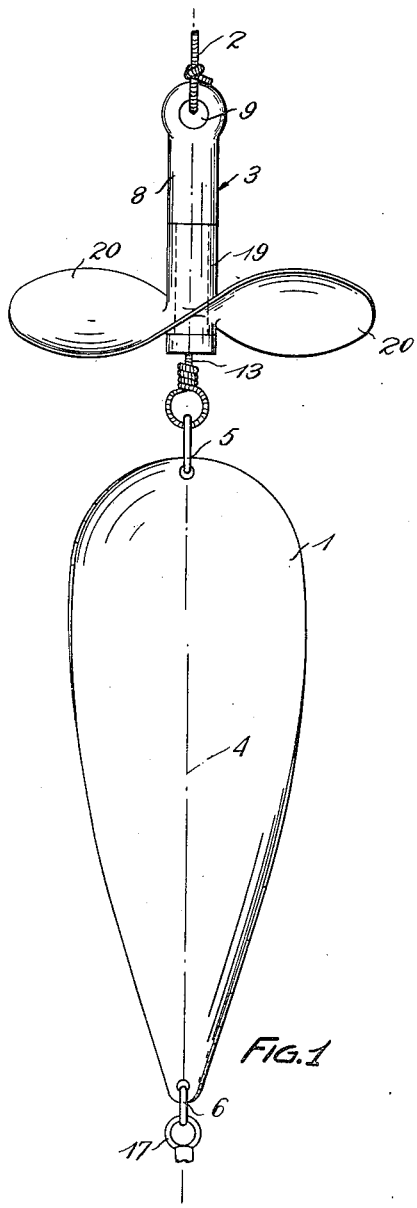
Figure 1 is a plan view of the attaching device showing a fish lure and a trolling line connected thereto.

Referring to the drawing, the numeral 1 indicates a fish lure adapted to be drawn through water by a trolling line 2, a connecting device indicated as a whole by the numeral 3 being provided for securing the fish lure to the trolling line 2. The fish lure 1 is formed from a flat sheet of metal which is twisted about an axis 4 passing through the ends 5 and 6 of the lure to provide curved surfaces which will cause a rotating movement of the lure as it is drawn through water. In addition, the tail portion or end 6 of the lure 1 is offset with respect to the axis 4 so that the center line 7 of the tail portion 6 intersects the axis of rotation 4 at an angle. The tail portion 6 is thus offset with respect to the axis 4 for effecting bodily movement of the lure 1 about an axis different from its rotation about the axis 4 as it is drawn through water. The type of lure 1 is disclosed in my copending application, Serial No. 272,211, filed May 6, 1939, to which reference is made for a more complete description. The connecting device 3 is particularly adapted for use in connection with a lure of the type shown although it will be apparent that the connecting device 3 may be used advantageously with any type of fish lure.

The connecting device 3 comprises a longitudinal body member 8 provided with an eyelet 9 at one end thereof by which the trolling line 2 may be connected to the body member 8. The body member 8 is provided with a central opening 10 extending inwardly from the end 11 thereof and terminating in an enlarged opening 12. A swivel 13 is mounted in the opening 10 and is provided with an enlarged head 14 engageable with an annular shoulder 15 for preventing movement of the swivel 13 outwardly with respect to the opening 10. The swivel 13 is provided with an eyelet 16 for connecting the member 3 to the lure 1 and the fish bait (not shown) connected to the lure 1 by the connecting device 17.

As the lure 1 is drawn through water, it will be rotated and will impart a turning movement to the swivel 13. Parts of the swivel 13 and particularly the head 14 are frictionally engageable with the body member 8 and upon turning movement thereof, a frictional force or torque will be encountered tending to impart a turning movement to the member 8. If turning movement of the member 8 is permitted, the undesirable twisting of the trolling line 2 will take place.

Figure 3:
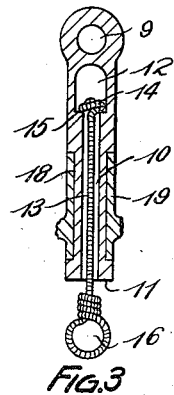
Figure 3 is a longitudinal sectional view of the device employed for connecting the lure to a trolling line, parts thereof being broken away.

To prevent twisting of the trolling line 2, the member 8 is provided with a cylindrical recess 18 as best shown in the sectional view of Figure 3, in which is rotatably mounted a sleeve 19. Propeller fins 20 are integrally or rigidly secured to the sleeve 19 for imparting a turning movement thereto as the member 8 is drawn through water.

Figure 2:
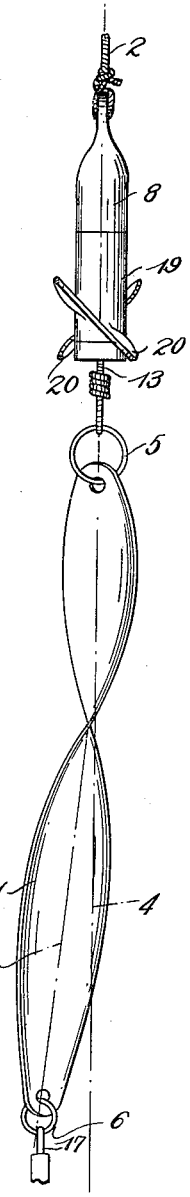
Figure 2 is a side elevational view of the parts shown in Figure 1.

As best shown in Figure 2, the inclination of the fins 20 is such as to impart a movement to the sleeve 19 in a clockwise direction, the surface of the lure 1 being formed to impart a rotational movement thereto in a counterclockwise direction. In this manner, the swivel 13 will be rotating in a counterclockwise direction while the sleeve 19 is rotating in an opposite direction. The sleeve 19 being frictionally engageable with the body member 8, a torque will be provided which will be effective to counteract the torque created by turning movement of the swivel 13 and thereby prevent turning movement of the member 8 and trolling line 2 by such torque. It will be understood that the size of the member 19 may be varied to provide the necessary amount of torque to prevent twisting of the trolling line 2 by rotation of the swivel 13.

From the foregoing, it will be apparent that there is provided a connecting device 3 for securing a rotatable fish lure 1 to a trolling line 2 which will be effective to prevent twisting of the line 2 by rotation of the lure 1 through the provision of the member 19 which is rotatable in a direction opposite to that of the fish lure 1.

It will also be apparent that the device 3 enhances the attractiveness of the lure 1, it of itself being a flashing device and thereby increases its utility.

The longitudinal formation of the body member 8 and the manner in which the sleeve 19 is mounted thereon permits movement of the member 3 through water with a minimum of resistance and provides an efficient carrier support for the propeller or flasher blades 20. By constructing the member 3 in this manner, the member 3 may be drawn through water in substantially a straight line. This feature is important in the case where the member 3 is used with a lure 1 of the type disclosed in my aforementioned copending application without interference with the particular movement for which the lure 1 is especially adapted.

Having thus described my invention, what I claim as new and desire to secure by Letters Patent of the United States, is:

1. In combination, a fishing line, lure connecting means comprising a body member attached to the fishing line, a swivel member attached to the body member and adapted to turn incident to force of rotation imparted thereto by movement of a lure secured to said swivel member, and an instrumentality movable relative to the body member so formed that as the line is pulled through the water said instrumentality frictionally engages the body member so as to counteract and prevent the turning of the connecting member under the engagement of the swivel member.

2. Means as set forth in claim 1, wherein the said instrumentality comprises a part rotatable by the action of water thereon as the line is pulled and having frictional rotative engagement with the body member sufficient to resist the turning of the body member due to turning of the swivel member.

3. In combination, a fishing line, a swivel connector device attached thereto comprising a body member secured to the line, a swivel member on said body member and having frictional engagement therewith, a lure constructed to rotate as the line is pulled through the water and attached to the swivel member, and a compensating member adapted to rotate in a direction opposite to the rotation of the lure, movable relatively to and engagingly connected to the body member to counteract and prevent the turning of the latter incident to the turning force exerted on the swivel member by the rotatable line.

4. In a connecting device of the character described, a body member, a swivel rotatably connected to said body member, and a compensating member rotatably mounted on said body member for rotation, said compensating member being adapted to be rotated in a direction opposite to the direction of rotation of said swivel to provide a frictional force counteracting the frictional force created by rotation of said swivel and tending to rotate said supporting member.

5. A fish lure comprising in combination, a tail member adapted to be rotated about two different axes as it is drawn through water by a trolling line, and means for connecting said tail member to a trolling line comprising a body member having a part adapted to be secured to a trolling line, a swivel connected to said tail member for rotation therewith and rotatably connected to said body member, and a member rotatably mounted on said body member provided with fins projecting outwardly therefrom for imparting a rotating motion thereto in a direction opposite to the direction of rotation of said tail member and said swivel as it is drawn through water by a trolling line.

6. In combination with a fish lure adapted to be rotated as it is drawn through water by a trolling line, a body member having means for connection with a trolling line, a swivel member rotatably connected with said body member and having means for connection with the fish lure and for rotation thereby, to said supporting member, and means preventing rotation of said body member by the frictional force created by the rotation of said swivel member comprising a sleeve rotatably mounted on said body member in frictional engagement therewith and provided with fins adapted to rotate said device in a direction opposite to the direction of rotation of said swivel member as it is drawn through water by a trolling line to provide a frictional force counteracting the frictional force tending to rotate said body member.

7. A connector for attaching rotating parts to fishing lines or the like, comprising a body member attachable to a line, a swivel member frictionally engaging said body member to support one of said rotating parts on said body member, said swivel member tending to turn said body member incident to rotation of such rotating part, and a compensating member connected to said body member for counteracting the tendency of said body member to turn as aforesaid, by rotating in a direction opposite to the rotation of said rotating part and frictionally engaging said body member.

EDWIN B. TURNER.